US008036985B2

(12) United States Patent  
Reid et al.

(10) Patent No.: US 8,036,985 B2  
(45) Date of Patent: *Oct. 11, 2011

(54) PRE-FUNDING SYSTEM AND METHOD

(75) Inventors: William Reid, Castro Valley, CA (US);  
Keiron G. Lynch, Pleasanton, CA (US);  
Craig Swackhammer, Pleasanton, CA (US);  
M. Kathrina Novak, Hayward, CA (US);  
L. Ted Martinez, Concord, CA (US);  
John M. Bryant, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 12/724,055

(22) Filed: Mar. 15, 2010

(65) Prior Publication Data

US 2010/0205092 A1    Aug. 12, 2010

Related U.S. Application Data

(63) Continuation of application No. 11/034,667, filed on Jan. 12, 2005, now Pat. No. 7,711,639.

(51) Int. Cl.  
    *G06Q 40/00*    (2006.01)
(52) U.S. Cl. ............................... 705/39; 705/36; 705/38
(58) Field of Classification Search .................... 705/35, 705/39, 36, 38, 99  
See application file for complete search history.

(56) References Cited

U.S. PATENT DOCUMENTS

| | | |
|---|---|---|
| 3,990,558 A | 11/1976 | Ehrat |
| 4,001,568 A | 1/1977 | Iizuka et al. |
| 4,116,469 A | 9/1978 | Harriman et al. |
| 4,280,037 A | 7/1981 | Schmidhauser |
| D263,638 S | 3/1982 | Donlin |
| 4,325,277 A | 4/1982 | Uchida et al. |
| 4,360,727 A | 11/1982 | Lehmann |
| 4,370,649 A | 1/1983 | Fuerle |
| 4,480,737 A | 11/1984 | Jamgochian et al. |

(Continued)

FOREIGN PATENT DOCUMENTS

WO    WO 01/33522    5/2001

(Continued)

OTHER PUBLICATIONS

Interbank Exposures and Systemic Risk. Martin Blavarg and Patrick Nimander, Economic Review, Sveriges Riksbank Economic Review, No. 2, 2002, pp. 19-45.*

(Continued)

*Primary Examiner* — Harish T Dass  
*Assistant Examiner* — Clifford Madamba  
(74) *Attorney, Agent, or Firm* — Kilpatrick Townsend & Stockton LLP

(57) ABSTRACT

A method for pre-funding is disclosed. The method includes sending a plurality of pre-fund authorization requests to a buyer financial institution, and then receiving a plurality of responses to the pre-fund authorization requests from the buyer financial institution, where each response either accepts or declines a pre-fund authorization request. A funds transfer request is sent to the buyer financial institution, where the funds transfer request corresponds to a total value of the accepted pre-fund authorization requests. Notification that funds have transferred from the buyer financial institution in response to the funds transfer request is received. Then, the sending of the funds to a supplier financial institution is authorized.

19 Claims, 3 Drawing Sheets

U.S. PATENT DOCUMENTS

| | | |
|---|---|---|
| 4,545,475 A | 10/1985 | Fillod et al. |
| 4,577,061 A | 3/1986 | Katzeff et al. |
| 4,585,936 A | 4/1986 | Sellier |
| 4,607,335 A | 8/1986 | Mizuno |
| 4,675,515 A | 6/1987 | Lucero |
| D290,954 S | 7/1987 | Read |
| 4,713,761 A | 12/1987 | Sharpe et al. |
| 4,796,193 A | 1/1989 | Pitchenik |
| 4,797,540 A | 1/1989 | Kimizu |
| 4,799,156 A | 1/1989 | Shavit et al. |
| 4,822,984 A | 4/1989 | Remery et al. |
| 4,858,121 A | 8/1989 | Barber et al. |
| 4,860,946 A | 8/1989 | Braud |
| 4,864,110 A | 9/1989 | Guillou |
| D304,725 S | 11/1989 | Rose |
| 4,890,228 A | 12/1989 | Longfield |
| 4,893,237 A | 1/1990 | Unno |
| 4,906,826 A | 3/1990 | Spencer |
| 4,920,256 A | 4/1990 | Marty et al. |
| 4,939,351 A | 7/1990 | Alaux et al. |
| 4,947,028 A | 8/1990 | Gorog |
| 4,972,463 A | 11/1990 | Danielson et al. |
| 4,974,878 A | 12/1990 | Josephson |
| 5,003,585 A | 3/1991 | Richer |
| 5,007,084 A | 4/1991 | Materna et al. |
| 5,055,657 A | 10/1991 | Miller et al. |
| 5,056,645 A | 10/1991 | Vidondo |
| 5,134,656 A | 7/1992 | Kudelski |
| 5,136,632 A | 8/1992 | Bernard |
| 5,191,193 A | 3/1993 | Le Roux |
| 5,192,855 A | 3/1993 | Insulander et al. |
| 5,193,057 A | 3/1993 | Longfield |
| 5,216,620 A | 6/1993 | Sansone |
| 5,222,018 A | 6/1993 | Sharpe et al. |
| 5,225,977 A | 7/1993 | Hooper et al. |
| 5,237,159 A | 8/1993 | Stephens et al. |
| 5,255,182 A | 10/1993 | Adams |
| 5,258,906 A | 11/1993 | Kroll et al. |
| 5,269,521 A | 12/1993 | Rossides |
| 5,284,253 A | 2/1994 | Watt et al. |
| 5,285,883 A | 2/1994 | Le Hong et al. |
| 5,289,923 A | 3/1994 | Coblentz et al. |
| 5,291,304 A | 3/1994 | Horii et al. |
| 5,297,030 A | 3/1994 | Vassigh et al. |
| 5,297,674 A | 3/1994 | Birutis et al. |
| 5,305,383 A | 4/1994 | Guillou et al. |
| 5,315,511 A | 5/1994 | Matsuura et al. |
| 5,336,870 A | 8/1994 | Hughes et al. |
| 5,359,183 A | 10/1994 | Skodlar |
| 5,359,509 A | 10/1994 | Little et al. |
| 5,375,172 A | 12/1994 | Chrosny |
| 5,383,113 A | 1/1995 | Kight et al. |
| 5,387,784 A | 2/1995 | Sarradin |
| RE34,872 E | 3/1995 | Lucero |
| 5,403,025 A | 4/1995 | Shanley |
| 5,412,190 A | 5/1995 | Josephson et al. |
| 5,412,191 A | 5/1995 | Baitz et al. |
| 5,412,886 A | 5/1995 | Quinn |
| 5,424,938 A | 6/1995 | Wagner et al. |
| 5,472,116 A | 12/1995 | Barbe et al. |
| 5,478,993 A | 12/1995 | Derksen |
| 5,479,510 A | 12/1995 | Olsen et al. |
| 5,491,325 A | 2/1996 | Huang et al. |
| 5,492,212 A | 2/1996 | Fillod et al. |
| 5,504,677 A | 4/1996 | Pollin |
| 5,532,464 A | 7/1996 | Josephson et al. |
| 5,532,920 A | 7/1996 | Hartrick et al. |
| 5,536,923 A | 7/1996 | Foglino |
| 5,575,374 A | 11/1996 | Orus et al. |
| 5,580,310 A | 12/1996 | Orus et al. |
| 5,583,759 A | 12/1996 | Geer |
| 5,586,036 A | 12/1996 | Pintsov |
| 5,590,196 A | 12/1996 | Moreau |
| 5,590,197 A | 12/1996 | Chen et al. |
| 5,591,949 A | 1/1997 | Bernstein |
| D378,219 S | 2/1997 | Marshlack |
| 5,614,892 A | 3/1997 | Ward, II et al. |
| 5,620,182 A | 4/1997 | Rossides |
| 5,635,695 A | 6/1997 | Feiken |
| 5,637,846 A | 6/1997 | Boers et al. |
| 5,637,848 A | 6/1997 | Lewiner et al. |
| 5,652,786 A | 7/1997 | Rogers |
| 5,655,023 A | 8/1997 | Cordery et al. |
| 5,671,364 A | 9/1997 | Turk |
| D385,304 S | 10/1997 | Griffin |
| 5,675,650 A | 10/1997 | Cordery et al. |
| D386,882 S | 11/1997 | Smith et al. |
| 5,691,524 A | 11/1997 | Josephson |
| 5,697,482 A | 12/1997 | Orus et al. |
| 5,699,528 A | 12/1997 | Hogan |
| 5,704,045 A | 12/1997 | King et al. |
| 5,706,925 A | 1/1998 | Orus et al. |
| 5,715,298 A | 2/1998 | Rogers |
| 5,717,868 A | 2/1998 | James |
| 5,717,989 A | 2/1998 | Tozzoli et al. |
| 5,727,249 A | 3/1998 | Pollin |
| 5,729,460 A | 3/1998 | Plett et al. |
| 5,739,511 A | 4/1998 | Pedersen |
| 5,740,247 A | 4/1998 | Violante et al. |
| 5,748,908 A | 5/1998 | Yu |
| 5,754,655 A | 5/1998 | Hughes et al. |
| 5,757,917 A | 5/1998 | Rose et al. |
| 5,761,308 A | 6/1998 | Torii et al. |
| 5,768,132 A | 6/1998 | Cordery et al. |
| 5,778,067 A | 7/1998 | Jones et al. |
| 5,783,808 A | 7/1998 | Josephson |
| D398,446 S | 9/1998 | Hosea |
| 5,808,723 A | 9/1998 | Klees |
| 5,812,945 A | 9/1998 | Hansen et al. |
| 5,816,174 A | 10/1998 | Smith et al. |
| 5,819,228 A | 10/1998 | Spiro |
| 5,819,236 A | 10/1998 | Josephson |
| 5,819,239 A | 10/1998 | Berson et al. |
| 5,826,241 A | 10/1998 | Stein et al. |
| 5,826,247 A | 10/1998 | Pintsov et al. |
| 5,832,089 A | 11/1998 | Kravitz et al. |
| 5,832,460 A | 11/1998 | Bednar et al. |
| 5,842,183 A | 11/1998 | Delfer, III et al. |
| D403,667 S | 1/1999 | Musha |
| 5,857,152 A | 1/1999 | Everett |
| 5,870,456 A | 2/1999 | Rogers |
| 5,873,072 A | 2/1999 | Kight et al. |
| D406,574 S | 3/1999 | Eckley et al. |
| 5,880,454 A | 3/1999 | Monicault |
| 5,883,810 A | 3/1999 | Franklin et al. |
| 5,884,288 A | 3/1999 | Chang et al. |
| 5,890,137 A | 3/1999 | Koreeda |
| 5,893,902 A | 4/1999 | Transue et al. |
| 5,893,907 A | 4/1999 | Ukuda |
| 5,903,880 A | 5/1999 | Biffar |
| 5,905,976 A | 5/1999 | Mjolsnes et al. |
| 5,907,832 A | 5/1999 | Pieterse et al. |
| 5,909,492 A | 6/1999 | Payne et al. |
| 5,914,472 A | 6/1999 | Foladare et al. |
| 5,924,084 A | 7/1999 | De Rooij |
| 5,930,778 A | 7/1999 | Geer |
| 5,936,219 A | 8/1999 | Yoshida et al. |
| 5,943,656 A | 8/1999 | Crooks et al. |
| 5,946,669 A | 8/1999 | Polk |
| 5,963,921 A | 10/1999 | Longfield |
| 5,963,924 A | 10/1999 | Williams et al. |
| 5,963,925 A | 10/1999 | Kolling et al. |
| 5,966,698 A | 10/1999 | Pollin |
| 5,973,619 A | 10/1999 | Paredes |
| 5,974,145 A | 10/1999 | Feiken |
| 5,974,146 A | 10/1999 | Randle et al. |
| 5,978,780 A | 11/1999 | Watson |
| 5,978,840 A | 11/1999 | Nguyen et al. |
| 5,983,207 A | 11/1999 | Turk et al. |
| 5,983,208 A | 11/1999 | Haller et al. |
| 5,987,132 A | 11/1999 | Rowney |
| 5,987,140 A | 11/1999 | Rowney et al. |
| 5,991,411 A | 11/1999 | Kaufman et al. |
| 5,991,412 A | 11/1999 | Wissenburgh et al. |
| 5,995,626 A | 11/1999 | Nishioka et al. |
| 5,999,625 A | 12/1999 | Bellare et al. |
| 6,006,199 A | 12/1999 | Berlin et al. |

| | | |
|---|---|---|
| 6,012,048 A | 1/2000 | Gustin et al. |
| 6,012,740 A | 1/2000 | Lupi |
| 6,014,646 A | 1/2000 | Vallee et al. |
| 6,016,484 A | 1/2000 | Williams et al. |
| 6,016,955 A | 1/2000 | De Rooij et al. |
| 6,021,943 A | 2/2000 | Chastain |
| 6,029,150 A | 2/2000 | Kravitz |
| 6,038,547 A | 3/2000 | Casto |
| 6,038,548 A | 3/2000 | Kamil |
| 6,041,315 A | 3/2000 | Pollin |
| 6,044,362 A | 3/2000 | Neely |
| 6,047,267 A | 4/2000 | Owens et al. |
| 6,047,269 A | 4/2000 | Biffar |
| 6,049,785 A | 4/2000 | Gifford |
| 6,049,786 A | 4/2000 | Smorodinsky |
| 6,052,671 A | 4/2000 | Crooks et al. |
| 6,052,674 A | 4/2000 | Zervides et al. |
| 6,056,322 A | 5/2000 | Lupi |
| 6,058,380 A | 5/2000 | Anderson et al. |
| 6,058,382 A | 5/2000 | Kasai et al. |
| 6,061,665 A | 5/2000 | Bahreman |
| 6,062,472 A | 5/2000 | Cheung |
| 6,065,675 A | 5/2000 | Teicher |
| 6,070,150 A | 5/2000 | Remington et al. |
| 6,070,798 A | 6/2000 | Nethery |
| 6,072,870 A | 6/2000 | Nguyen et al. |
| 6,073,104 A | 6/2000 | Field |
| 6,073,113 A | 6/2000 | Guinan |
| 6,073,125 A | 6/2000 | Cordery et al. |
| 6,076,073 A | 6/2000 | Pieterse et al. |
| 6,076,074 A | 6/2000 | Cotton et al. |
| 6,076,075 A | 6/2000 | Teicher |
| 6,081,790 A | 6/2000 | Rosen |
| 6,085,169 A | 7/2000 | Walker et al. |
| 6,102,287 A | 8/2000 | Matyas, Jr. |
| 6,108,531 A | 8/2000 | Berg et al. |
| 6,109,837 A | 8/2000 | Mausy |
| 6,115,601 A | 9/2000 | Ferreira |
| 6,119,107 A | 9/2000 | Polk |
| 6,122,625 A | 9/2000 | Rosen |
| 6,125,354 A | 9/2000 | MacFarlane et al. |
| 6,129,272 A | 10/2000 | Yoshida et al. |
| 6,135,261 A | 10/2000 | Noell, Jr. et al. |
| 6,138,907 A | 10/2000 | Mori et al. |
| 6,163,771 A | 12/2000 | Walker et al. |
| 6,167,378 A | 12/2000 | Webber, Jr. |
| 6,167,385 A | 12/2000 | Hartley-Urquhart |
| 6,169,974 B1 | 1/2001 | Baumgartner et al. |
| 6,173,269 B1 | 1/2001 | Solokl et al. |
| 6,173,272 B1 | 1/2001 | Thomas et al. |
| 6,178,409 B1 | 1/2001 | Weber et al. |
| 6,181,361 B1 | 1/2001 | Bluteau et al. |
| RE37,067 E | 2/2001 | Feiken |
| 6,185,545 B1 | 2/2001 | Resnick et al. |
| 6,193,152 B1 | 2/2001 | Fernando et al. |
| 6,199,107 B1 | 3/2001 | Dujari |
| 6,202,052 B1 | 3/2001 | Miller |
| 6,202,054 B1 | 3/2001 | Lawlor et al. |
| 6,205,433 B1 | 3/2001 | Boesch et al. |
| 6,205,435 B1 | 3/2001 | Biffar |
| 6,205,437 B1 | 3/2001 | Gifford |
| 6,206,285 B1 | 3/2001 | Baitz et al. |
| 6,216,115 B1 | 4/2001 | Barrameda et al. |
| 6,222,914 B1 | 4/2001 | McMullin |
| 6,227,447 B1 | 5/2001 | Campisano |
| 6,230,148 B1 | 5/2001 | Pare, Jr. et al. |
| 6,233,565 B1 | 5/2001 | Lewis et al. |
| 7,711,639 B2 | 5/2010 | Reid et al. |
| 7,822,679 B1 | 10/2010 | Vaux et al. |
| 2003/0093367 A1 | 5/2003 | Allen-Rouman et al. |
| 2004/0030647 A1 | 2/2004 | Hansen et al. |
| 2004/0034583 A1* | 2/2004 | Lanier et al. ............ 705/35 |
| 2004/0049449 A1 | 3/2004 | Martinelli |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0015428 A1* | 1/2006 | Friedman ............ 705/35 |
| 2007/0208638 A1 | 9/2007 | Brown |

FOREIGN PATENT DOCUMENTS

WO    WO 01/57770    8/2001

OTHER PUBLICATIONS

Payment System Settlement and Bank Incentives. CM Kahn and W Roberts, Review of Financial Studies Mini Issues 1998; vol. 11, No. 4, Abstract.*

Alternative Models for Clearance and Settlement: The Case of the Single European Capital Market. Ian Giddy et al., Journal of Money, Credit & Banking, vol. 28, 1996, Abstract.*

Interbank Exposures and Systemic Risk. Martin Blavarg and Patrick Nimander, Economic Review, Sveriges Riksbank Economic Review, No. 2, 2002, pp. 19-45.

Payment System Settlement and Bank Incentives. CM Kahn and W Roberts, Review of Financial Studies Mini Issues 1998; vol. 11, No. 4, Abstract.

Alternative Models for Clearance and Settlement: The Case of the Single European Capital Market. Ian Giddy et al., Journal of Money, Credit & Banking, vol. 28, 1996, Abstract.

* cited by examiner

PRE-FUNDING SYSTEM AND METHOD

CROSS REFERENCE TO RELATED APPLICATIONS

This application is a continuation of U.S. patent application Ser. No. 11/034,667, filed Jan. 12, 2005, entitled "Pre-Funding System and Method," which is incorporated herein by reference in its entirety for all purposes.

BACKGROUND OF THE INVENTION

In many business-to-business transactions, checks, ACH/EFT (automated clearing house/electronic funds transfer) and wires are used for payment. Commerce systems strive to improve processing efficiencies and improve integration with existing business operations.

Commerce systems seek to minimize the risk associated with defaulting members. To effectively manage risk, commerce system participation can be limited to members meeting pre-determined standards. In addition, more conservative daily aggregate debit limits and single transaction limits can be established at either a regional or bank level to manage risk.

In a typical commerce system, if a Buyer Bank (Issuer) fails to settle a payment, a payment processing organization can be allowed to reclaim funds from a Supplier Bank (Acquirer). If funds reclamation is unsuccessful, the payment processing organization may rely on the liability allocation in the rules and the loss-sharing provisions stated in the appropriate by-laws governing the relationship between the Buyer Bank, the Supplier Bank, and the payment processing organization.

While a funds reclamation provision may be used to reclaim funds, a funds reclamation provision creates uncertainty regarding the finality of funds for the Supplier Banks. This uncertainty has already been identified as a concern and a potential barrier to widespread market adoption of any payment processing system. It also ultimately impedes the ability to provide ubiquity in the marketplace.

Additionally, a funds reclamation process has many operational challenges. Because of multilateral netting, potentially all participants in the commerce system could be impacted from a recast with those participants that may have received funds via a credit position subject to funds reclamation. "Multilateral netting" can be defined as the offsetting of receivables and payables among three or more parties to a transaction, with each making payments to an agent or clearing house for net obligations due to others or receiving net payments due from others. In a multilateral netting scheme, any participant that misses funding a debit position by any amount of time (e.g, 1 second) or short-pays by any amount (e.g., 1 cent) could trigger a recast. All transactions may have to be re-evaluated to determine which participant and/or which transaction caused the recast. This is undesirable.

The payment processing organization could provide limited funding to prevent such a recast scenario. However this results in the payment processing organization accepting settlement risk, which conceptually defeats the goal of eliminating settlement risk through recasting.

Embodiments of the invention address these and other problems, individually and collectively.

SUMMARY OF THE INVENTION

Embodiments of the invention are directed to pre-funding methods and systems.

One embodiment of the invention is directed to a method for pre-funding, the method comprising: sending a plurality of pre-fund authorization requests to a buyer financial institution; receiving a plurality of responses to the pre-fund authorization requests from the buyer financial institution, wherein each response either accepts or declines a pre-fund authorization request; sending a funds transfer request to the buyer financial institution, wherein the funds transfer request corresponds to a total value of the accepted pre-fund authorization requests; and authorizing the sending of funds to a supplier financial institution after the funds have transferred from the buyer financial institution to an account in response to the funds transfer request.

Another embodiment of the invention is directed to a computer readable medium comprising: code for sending a plurality of pre-fund authorization requests to a buyer financial institution; code for receiving a plurality of responses to the pre-fund authorization requests from the buyer financial institution, wherein each response either accepts or declines a pre-fund authorization request; code for sending a funds transfer request to the buyer financial institution, wherein the funds transfer request corresponds to a total value of the accepted pre-fund authorization requests; code for authorizing the sending of funds to a supplier financial institution after the funds have transferred from the buyer financial institution to an account in response to the funds transfer request.

Other embodiments are directed to computer systems and servers incorporating the computer readable medium according to embodiments of the invention.

These and other embodiments will be described in more detail below.

DETAILED DESCRIPTION

Embodiments of the invention are directed to pre-funding methods and systems. In embodiments of the invention, Buyer Banks (or other buyer financial institutions) that do not meet predetermined standards, may be required to pre-fund their daily aggregate debit totals to participate in the commerce system. Additionally, Buyer Banks that do meet pre-determined standards and do not wish to be constrained by daily aggregate debit total limits, may participate in the pre-funding system on an ongoing basis.

One aspect of embodiments of the invention is that the Buyer Bank will be required to submit payment into an account run by a payment processing organization, for the amount of daily aggregate debits, prior to the payment-processing organization's settlement to a Supplier Bank. The Buyer Bank receives advance notice of the daily aggregate debit totals with enough lead-time to fund the account.

In embodiments of the invention, existing or newly created payment processing systems can be used. As will be described in detail below, the payment processing system may include a subsystem to efficiently implement the pre-funding objective. This subsystem need not be constrained by a 24-hour cycle. The subsystem can also have pre-determined cutoff times to aggregate authorizations for an FTS (funds transfer system) which will release a true financial request for funds to the Buyer Bank.

Embodiments of the invention are described with reference to FIGS. 1 and 2(a)-2(b). These Figures show a single Buyer Bank and a single Supplier Bank for ease of illustration. However, in embodiments of the invention, tens or even hundreds of buyer financial institutions may participate in embodiments of the invention. It is also understood that in other embodiments of the invention, the Buyer Bank could alternatively be any other financial institution (e.g., a financial institution associated with the buyer's workplace such as a credit union, a brokerage, the buyer's workplace, etc.) representing a buyer. The Supplier Bank could be any other financial institution representing the supplier (e.g., a credit union, brokerage firm, etc.). Also, the buyer and the supplier may be individuals, corporations, etc.

Figure 1:
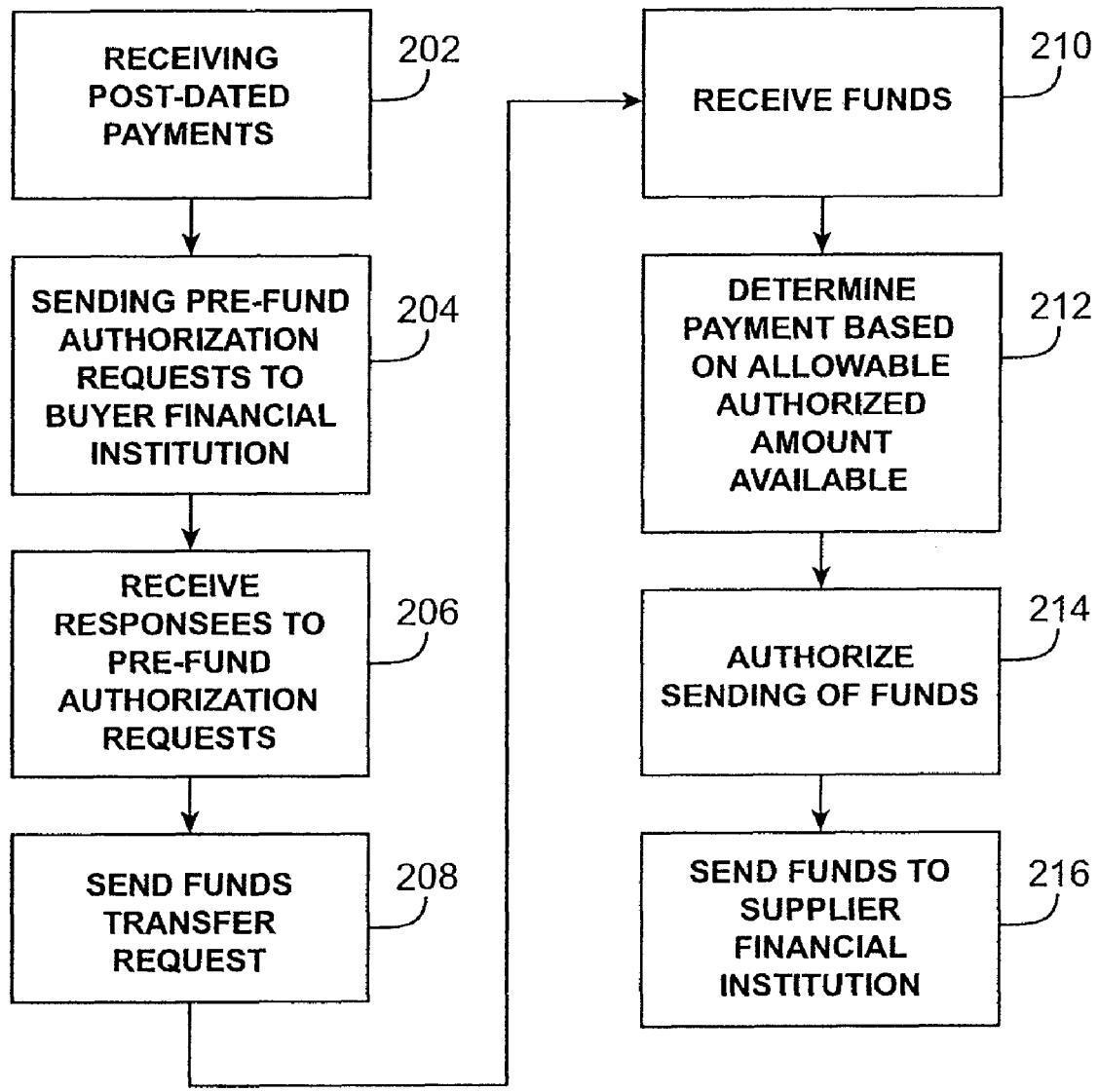
FIG. 1 shows a flowchart illustrating a method according to an embodiment of the invention.

FIG. 1 shows a flowchart illustrating the general process flow for a method according to an embodiment of the invention. The method includes receiving one or more post-dated payments from a buyer (step 202). The payments may be post-dated any suitable number of days in advance.

After receiving the post-dated payments, a network or even a single computational apparatus sends one or more pre-fund authorization requests to a buyer financial institution (e.g., a Buyer Bank) associated with the buyer (step 204). This is preferably done from 12-72 hours before the payment dates for the post-dated payments. Sending the pre-authorization requests far in advance (e.g, 90 days) would make the funds less liquid, while sending the pre-authorization requests very shortly before the payment due dates may not provide the system with enough time to process the information needed for the pre-funding process described herein.

Once the buyer financial institution receives the pre-authorization requests, the buyer financial institution then sends messages back to the network indicating that the pre-fund authorization requests are either accepted or rejected (step 206). The above-noted subsystem then sends accumulated pre-fund authorizations to an FTS (funds transfer system). A funds transfer request is then sent by the FTS to the buyer financial institution to transfer actual funds (step 208). The funds are then transferred from the buyer financial institution to a settlement financial institution (step 210). The settlement financial institution may temporarily hold the received funds until settlement. After the funds are received by the settlement financial institution, the subsystem will authorize or decline the accumulated payments based on an "allowable authorized amount" available in the subsystem (steps 212 and 214). The FTS (funds transfer system) then sends a request to a settlement financial institution to send the funds to the supplier financial institution such as a supplier bank (step 216). The supplier financial institution then sends the funds to the supplier.

The steps shown in FIG. 1 may be performed by one or more computational apparatuses such as one or more server computers working with one or more client computers. The server computers may operate using any suitable operating system including commercially available operating system such as a Windows, Unix, or Linux based operating system. A server computer may be a powerful computer or cluster of computers that behaves as a single computer, which services the requests of one or more client computers. The server computer can be a mainframe computer, a minicomputer, or a minicomputer cluster. For example, the server computer may include one or more database servers and one or more Web servers.

Code for performing any of the functions shown in FIG. 1, or any of the functions described in this application, may be present on a computer readable medium in a single computational apparatus, or many computational apparatuses operationally coupled together. For example, a computer readable medium may include two or more data storage media located on separated, but operationally coupled servers. The computer readable medium may comprise any suitable optical, electrical, or electrical data storage medium, and code for performing the functions mentioned in FIG. 1 and in this application may be created using any suitable programming language including C, C++, etc.

More detailed descriptions of embodiments of the invention can be described with reference to FIGS. 2(a)-2(b).

Figure 2A:
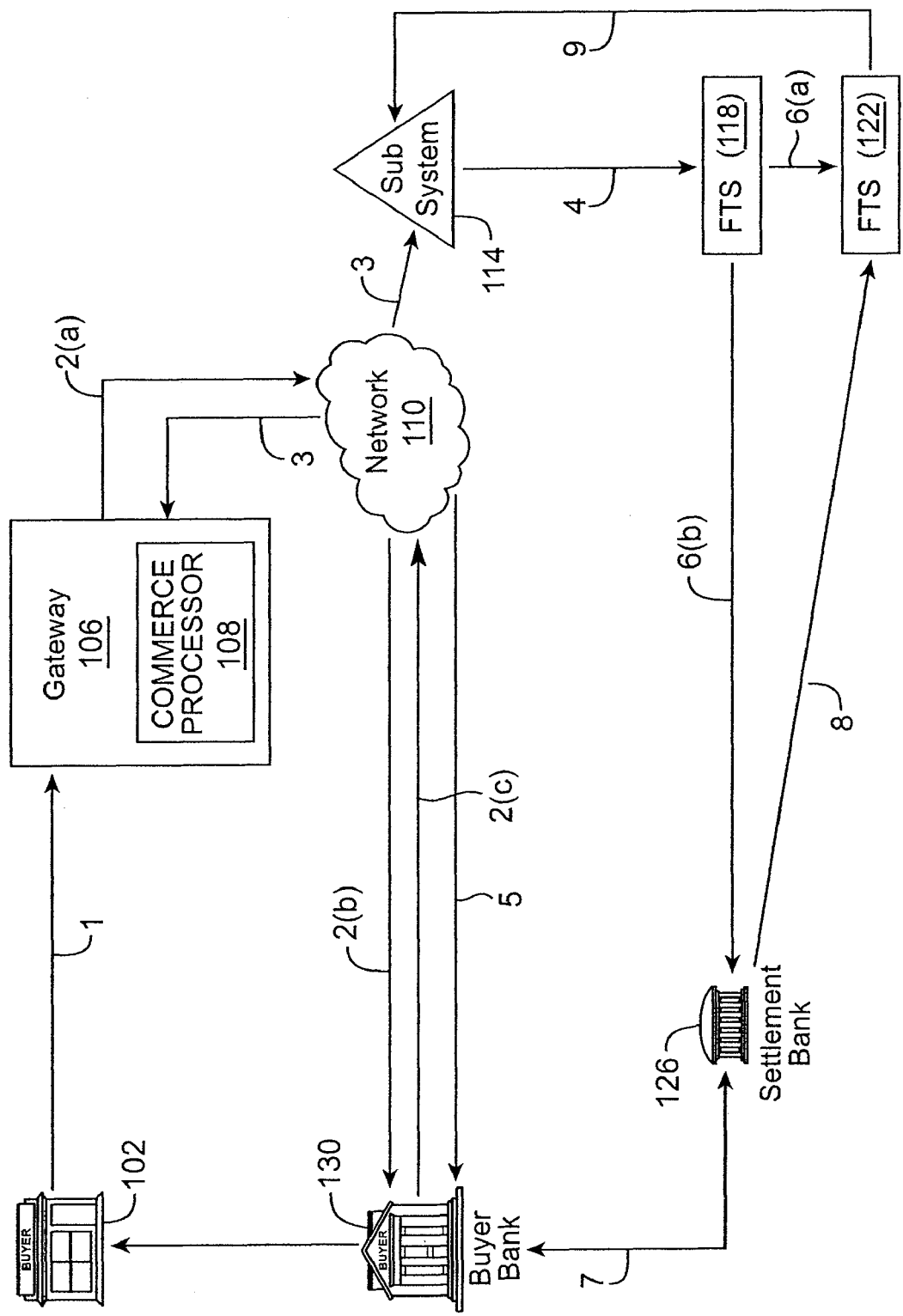
FIGS. 2(a) and 2(b) show a system according to an embodiment of the invention.

Referring to FIG. 2(a), and as shown by arrow 1, a buyer 102 will send one or more post-dated payments to a gateway 106. The gateway 106 may be a physical or electronic access point for the buyer 102 to make one or more post-dated payments. A commerce processor (CP) 108 in the gateway 106 receives the post-dated payments from the buyer 102. The commerce processor 108 may be a standalone server computer that exists outside of a network 110, or it may be part of a network 110.

The buyer 102 may be previously designated a "pre-fund" buyer, because the buyer 102 may have a relationship with a "pre-fund" participant financial institution. The one or more post-dated payments can be for goods or services provided to the buyer 102 from a supplier 140 (see FIG. 2(b)). The buyer 102 and the supplier 140 may deal with goods and services of any suitable nature.

As shown by the arrow 2(a), at a predetermined time before the payment date, the commerce processor 18 creates "pre-fund authorization" requests for each payment. Each pre-fund authorization request is then sent to the network 110. The network 110 may include a collection of computational apparatuses, and may incorporate wired or wireless links. In some embodiments, the predetermined time may be from about 12 to about 72 hours. In other embodiments, longer or shorter times may be used. The network 110 may also include a subsystem 114 in some embodiments of the invention. The subsystem 114 may be embodied by one or more computational apparatuses, or software residing on one or more computational apparatuses.

As shown by arrow 2(b), the network 110 sends (e.g., transmits), either directly or through an intermediary, a number of pre-fund authorization requests to the Buyer Bank 130. The pre-fund authorizations may be in any suitable form. For example, they may be in the form of non-financial authorization messages. An SMS message is a type of text message. Other message protocols may be used in other embodiments of the invention. The sending of the requests may occur electronically over a communication medium that uses wired or wireless links. The communication medium may include portions of the Internet or direct communication links.

A Buyer Bank "pre-fund" participation flag may be provided in some embodiments of the invention. The commerce processor 108 can add a new attribute to the Buyer Bank setup that defines the settlement process for the Buyer Bank and its respective customers. All settlement schemes, with the exception of the pre-fund solution, can be transparent to the system, or the flag could just indicate, "pre-funded" or "not pre-funded".

The commerce processor 108 can also add a new attribute to the Buyer Bank setup to define the cutoff time for processing. The system would use this parameter to calculate the minimum payment date for all buyers' payments doing business through the pre-funding Buyer Bank. As noted above, it is preferable that the parameter is less than 72 hours and greater than 12 hours.

In a bank-timed payment processing scheme, the commerce processor 108 can process post-dated payments some-time after midnight according to the time zone defined for the buyer 102 creating the payment. For this process to function, payments (for these pre-funded banks) can be processed after midnight according to the time zone of the Buyer Bank 130. This exception can be managed according to the participation flag on the Buyer Bank 130.

As shown by arrow 2(c), the Buyer Bank 130 responds by accepting or declining the received pre-fund authorization requests. Once authorized, the network 110 will route the accepted pre-fund authorization back to the commerce processor 108 and to the subsystem 114. At this point, the Buyer Bank 130 might choose to place a hold on the buyer's bank account or do whatever is necessary to ensure that it has the funds to transfer according to the accepted pre-authorization requests. Once the Buyer Bank 130 authorizes the pre-fund authorization request, the payment can be "locked down" and barred from further modification. The subsystem 114 accumulates the accepted pre-fund authorizations by the Buyer Bank. If declined, the network 110 will route the rejected pre-fund authorizations back to the commerce processor 108 (the originator). The commerce processor 108 will update the state of the transaction to "pre-authorized" or "declined". The subsystem 114 is optionally not informed of any declined pre-authorization requests.

As shown by arrow 4, the subsystem 114 sends the accumulated, accepted pre-fund authorizations to a funds transfer system (FTS) 118. At various predetermined points, the subsystem 114 (arrow 3) creates aggregate debit totals for the funds transfer system (FTS) 118. Before or after this, the network 100 reports the aggregate debt totals to the Buyer Bank 130 (see arrow 5). The Buyer Bank 130 is notified via standard reporting in advance of the pre-fund funds transfer request (it contains the aggregate debit totals).

As shown by arrow 6(a), the funds transfer system 118 then sends an "expected" file for a treasury reconciliation system (TRS) 122. At a predetermined cutoff time, the funds transfer system 118 creates a funds transfer request (and allows for optional approve/release functionality) and sends it to a Settlement Bank 126 (as shown by reference numeral 6(b)). The Settlement Bank 126 then requests funds (aggregate debit total) from the Buyer Bank 130. The network 110 may be notified of this request.

After a predetermined amount of time, the Buyer Bank 130 sends (e.g., wires) the funds to a settlement account in the Settlement Bank 126 (as shown by arrow 7). The sending of funds to the Settlement Bank 126 may occur electronically.

Actual funds are then transferred to the treasury reconciliation system 122 and it will utilize conventional settlement account reconciliation processes (as shown by arrow 8). Based on the pre-fund amount received and reconciled by the treasury reconciliation system 122, the "allowable authorized amount" is determined and then populated in the subsystem 114 (as shown by arrow 9).

Figure 2B:
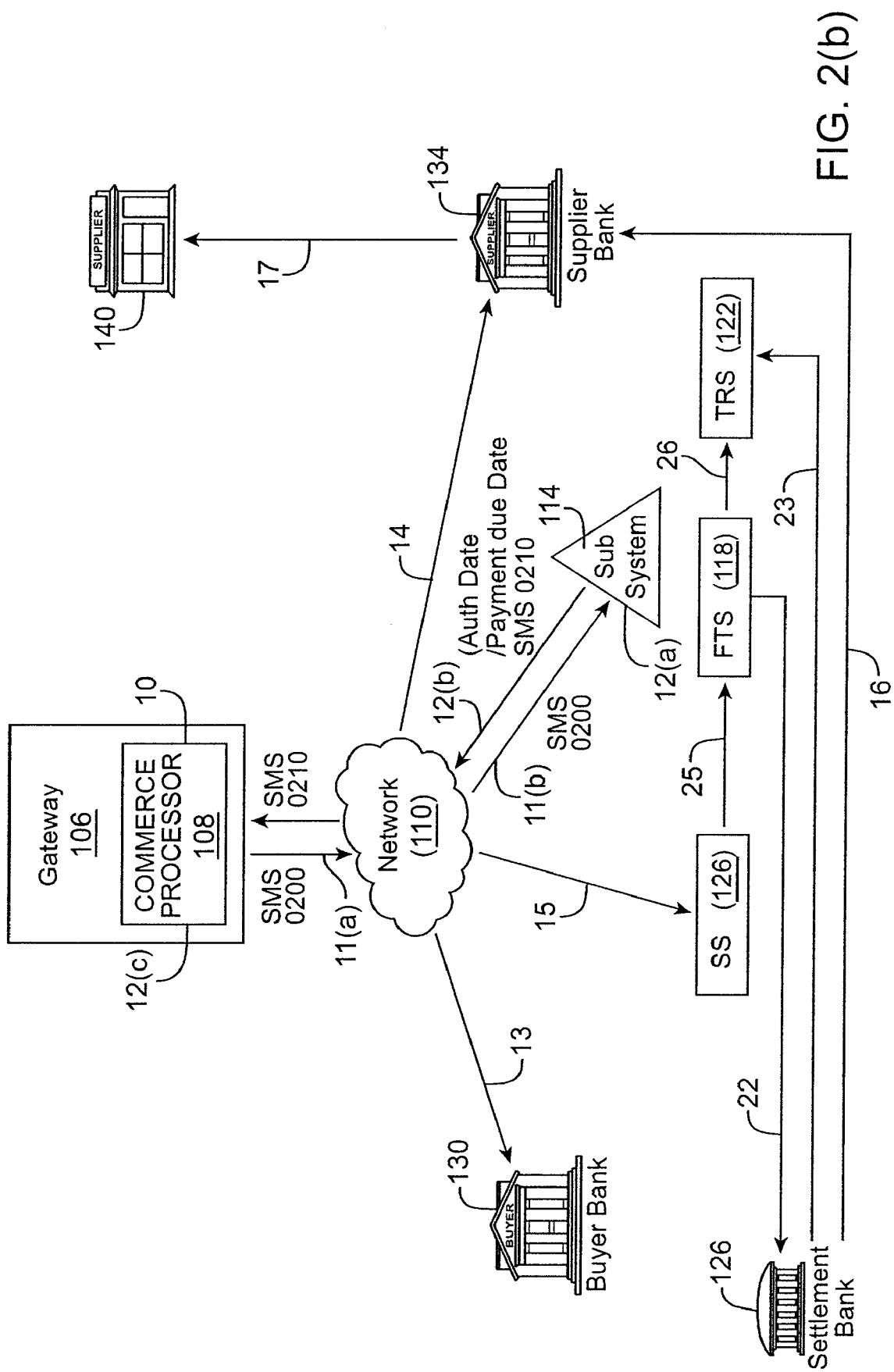

Referring now to FIG. 2(b) and reference numbers 10, 11(a), and 11(b), upon the payment due date, the commerce processor 108 submits SMS full financial messages (or other types of messages) for accept or decline to the network 110. This message is then sent to the subsystem 114 (not to the Buyer Bank 130) for authorization (based on the Buyer Bank "pre-fund" participation flag). The commerce processor 108, upon receiving the authorization response from the network 110, will update the state of the transaction to "authorized" or "declined". If declined, the commerce processor 108 can supply the reason code obtained from the network 110.

As shown by reference number 12(a), the subsystem 114 will authorize or decline the payment based on the "allowable authorized amount" available in the subsystem 114. This allowable authorized amount will diminish as full financial messages are submitted. Typically, the allowable authorized amount will diminish or decrement according to a first-in-first out process. For example, funds for a first payment and funds for a second payment may be populated in the subsystem 114. When it is time to settle the payments, funds for the first payment are paid out and then funds for the second payment are paid out. If a transaction is declined by the subsystem 114, because the transaction amount exceeds the "allowable authorized amount", then the Buyer Bank 130 will be notified and the credit destined for the Supplier Bank 134 will not occur. Notification of decline to the Buyer Bank 130 can utilize existing communication networks. The Buyer Bank 130 may be notified and the commerce processor 108 may receive a decline message with a proper reason code such as "insufficient pre-funding".

Illustratively, there may be 10 payments due on a particular post date such as Jun. 1, 2004. The total of those payments that are due on that post date may be $1000 and there may be 10 payments of $100 each. Instructions are sent to the Buyer Bank to fund the account so that the payment due date can be met. Once the funds are received by the subsystem, real transactions then take place. For example, for the first $100 payment, the allowable authorized amount is decremented by $100 so the remaining amount is $900. This continues until the funds in the account are depleted. If, for example, the last payment is $100, and there is only $99 left in the account, that transaction will be rejected, and a message such as "insufficient pre-funding" will be sent to the Buyer Bank 130. Although one $100 payment was rejected due to insufficient pre-funding, the nine other $100 payments were accepted and processed. However, another request for $99 or less could be accepted. The system may only reject amounts greater than the total remaining in the account, but would continue to allow amounts less than the total remaining in the account. Preferably, the system rejects as few transactions as possible.

As shown by arrow 12(b), a message including the authorization date and the payment due date may be sent to the network 110. As shown by arrow 13, clearing records and settlement service reports may be sent to the Buyer Bank 130.

As shown by arrow 14, raw data, settlement service reports, and pre-authorization information may be sent to the Supplier Bank 134. The Supplier Bank 134 may receive a summary of the settlement totals and a detailed report of the day's "pre-fund authorizations".

As shown by arrow 15, the network 110 then sends the normal daily settlement data and reporting to a settlement service (SS) 126, which sends this information to the funds transfer system (FTS) 118 (reference number 25). Information regarding an "expected" amount of funds is transferred to the treasury reconciliation system (TRS) 122 (reference number 26) and information regarding an actual amount of funds is also transferred to the treasury reconciliation system (TRS) 122 (reference number 23).

As shown by arrow 16, a gross wire is then sent from the Settlement Bank 126 to the Supplier Bank 134. For pre-funding, the FTS 118 can create funds transfers (reference 22) based on the gross credit position rather than the "net position". The debit positions will be treated as a memo post for balancing since the true request for funds was released the prior day.

As shown by arrow 17, the supplier bank 134 then sends the funds to the Supplier's 140 demand deposit account (DDA) to settle the transaction(s) between the buyer 102 and the supplier 140.

Embodiments of the invention provide for a number of advantages. As explained above, because buyer payments are "pre-funded", a payment processing organization that settles a transaction between a buyer and a supplier is not exposed to significant settlement risk. In addition, recasts due to missed funding of debit positions are not a problem in embodiments of the invention. Unlike a multilateral netting scheme, in embodiments of the invention, payments are made with available funds. If there are insufficient funds for a small number of payments, other payments still take place without the need to go through the recasting process.

The terms and expressions which have been employed herein are used as terms of description and not of limitation, and there is no intention in the use of such terms and expressions of excluding equivalents of the features shown and described, or portions thereof, it being recognized that various modifications are possible within the scope of the invention claimed. Moreover, any one or more features of any embodiment of the invention may be combined with any one or more other features of any other embodiment of the invention, without departing from the scope of the invention.

Also, it should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

All references, patent applications, and patents mentioned above are herein incorporated by reference in their entirety for all purposes. None of them are admitted to be prior art to the presently claimed inventions.

What is claimed is:

1. A method for pre-funding, the method comprising:
   receiving a plurality of post-dated payments;
   sending a plurality of pre-fund authorization requests to a buyer financial institution,
   wherein the pre-fund authorization requests are generated by a server computer from the plurality of post-dated payments; and
   receiving a plurality of responses to the pre-fund authorization requests from the buyer financial institution, wherein each response either accepts or declines a pre-fund authorization request;
   wherein a funds transfer request is subsequently sent to the buyer financial institution based on the buyer financial institution accepting the pre-fund authorization requests,
   wherein the funds transfer request corresponds to a total value of the accepted pre-fund authorization requests; and
   wherein the sending of funds to a supplier financial institution occurs after the funds have transferred from the buyer financial institution to an account in response to the funds transfer request.

2. The method of claim 1,
   wherein the pre-fund authorization requests are made between 0 and 72 hours before the post-dated payments are due.

3. The method of claim 1,
   wherein authorizing the sending of funds to the supplier financial institution comprises authorizing the post-dated payments using a first in, first out process.

4. The method of claim 1,
   wherein the method further comprises: sending the funds to the supplier financial institution.

5. The method of claim 1,
   wherein the method further comprises: sending the funds to the supplier financial institution, and wherein the sent funds are an aggregate amount based on the accepted pre-fund requests.

6. The method of claim 1,
   further comprising: accumulating the accepted pre-fund authorization requests before sending the funds transfer request to the buyer financial institution.

7. The method of claim 1,
   wherein the buyer financial institution is a buyer bank and the supplier financial institution is a supplier bank.

8. The method of claim 1,
   wherein after authorizing the sending of funds to the supplier financial institution, the funds are sent by the supplier financial institution to suppliers.

9. A computer non-transitory readable medium comprising code, executable by a processor, for implementing a method comprising:
   receiving a plurality of post-dated payments;
   sending a plurality of pre-fund authorization requests to a buyer financial institution,
   wherein the pre-fund authorization requests are generated by a server computer from the plurality of post-dated payments; and
   receiving a plurality of responses to the pre-fund authorization requests from the buyer financial institution, wherein each response either accepts or declines a pre-fund authorization request;
   wherein a funds transfer request is subsequently sent to the buyer financial institution based on the buyer financial institution accepting the pre-fund authorization requests,
   wherein the funds transfer request corresponds to a total value of the accepted pre-fund authorization requests; and
   wherein the sending of funds to a supplier financial institution occurs after the funds have transferred from the buyer financial institution to an account in response to the funds transfer request.

10. The computer readable medium of claim 9,
    wherein the pre-fund authorization requests are made between 0 and 72 hours before the post-dated payments are due.

11. The computer readable medium of claim 9,
    wherein authorizing the sending of funds to the supplier financial institution comprises authorizing the post-dated payments using a first in, first out process.

12. The computer readable medium of claim 9,
    wherein the method further comprises sending the funds to the supplier financial institution.

13. The computer readable medium of claim 9,
    wherein method further comprises: sending the funds to the supplier financial institution, and wherein the sent funds are an aggregate amount based on the accepted pre-fund requests.

14. The computer readable medium of claim 9,
    wherein the method further comprises accumulating the accepted pre-fund authorization requests before sending the funds transfer request to the buyer financial institution.

15. The computer readable medium of claim 9,
    wherein the buyer financial institution is a buyer bank and the supplier financial institution is a supplier bank.

16. The computer readable medium of claim 9,
    wherein the method further comprises code for sending the funds to suppliers.

17. A server computer comprising:

a processor; and a computer readable medium coupled to the processor, the computer readable medium comprising code, executable by the processor, for implementing a method comprising receiving a plurality of post-dated payments, sending a plurality of pre-fund authorization requests to a buyer financial institution, wherein the pre-fund authorization requests are generated by a server computer from the plurality of post-dated payments, and receiving a plurality of responses to the pre-fund authorization requests from the buyer financial institution, wherein each response either accepts or declines a pre-fund authorization request, and wherein a funds transfer request is subsequently sent to the buyer financial institution, wherein the funds transfer request corresponds to a total value of the accepted pre-fund authorization requests based on the buyer financial institution accepting the pre-fund authorization requests, and the sending of funds to a supplier financial institution occurs after the funds have transferred from the buyer financial institution to an account in response to the funds transfer request.

18. The server computer of claim 17, wherein the pre-fund authorization requests are made between 0 and 72 hours before the post-dated payments are due.

19. The server computer of claim 17, wherein authorizing the sending of funds to the supplier financial institution comprises authorizing the post-dated payments using a first in, first out process.

\* \* \* \* \*